March 12, 1929. W. A. HORTHY ET AL 1,705,292
LINER FOR TEAT CUPS OF MILKING MACHINES
Filed Nov. 7, 1925

Inventors
William A. Horthy
and Floyd G. Hodsdon,
By H.P. Davies
Atty.

Patented Mar. 12, 1929.

UNITED STATES PATENT OFFICE.

WILLIAM ARNOLD HORTHY AND FLOYD G. HODSDON, OF CHICAGO, ILLINOIS, ASSIGNORS TO INTERNATIONAL HARVESTER COMPANY, OF CHICAGO, ILLINOIS, A CORPORATION OF NEW JERSEY.

LINER FOR TEAT CUPS OF MILKING MACHINES.

Application filed November 7, 1925. Serial No. 67,518.

The present invention has reference to teat cups employed in milking machines and especially to the liner or teat engaging member for such teat cups.

These teat cups as now known in the art are in the form of an elongated tubular member and supported therein to engage a teat is a liner, usually made of rubber. In the use of these teat cups it has been difficult to keep the liner from disengaging the teat and falling therefrom. This is objectionable as the cup in falling on a barn floor, where these machines are usually employed, becomes dirty, and creates an unsanitary condition, and sanitation in this art is of the greatest importance as can readily be appreciated.

Accordingly, it is the main object of the invention to provide a teat cup liner embodying features which will prevent its accidental disengagement from the teat without causing injury to the cow, and thereby enhancing a better condition of sanitation and efficiency in mechanical milking.

Another object is to provide such a liner, which can easily and securely be supported in the teat cup and yet be quickly removed therefrom for cleaning purposes.

Other objects will very likely present themselves as the description of this invention progresses.

In the preferable embodiment herein disclosed these objects are accomplished in the provision of a teat cup liner of unitary construction embodying a double locking ring structure for engaging the teat and preventing disengagement therefrom.

In the accompanying sheet of drawings,—

Figure 1:
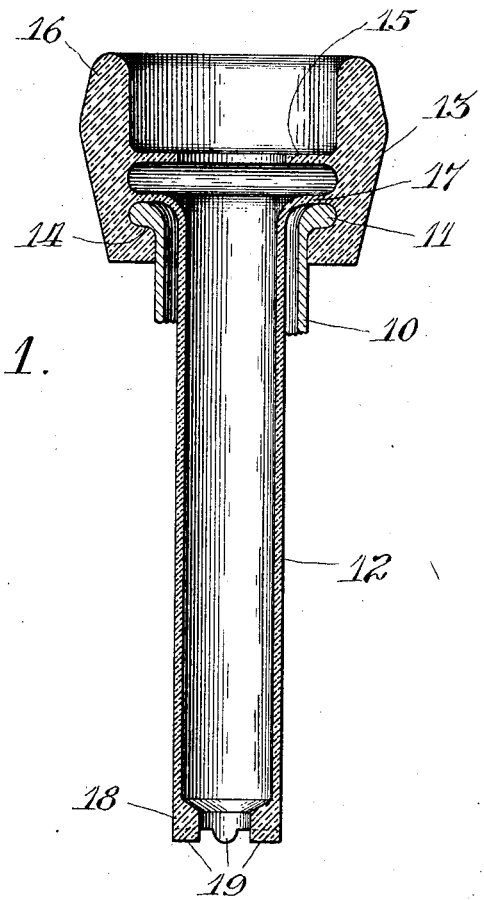
Figure 2:
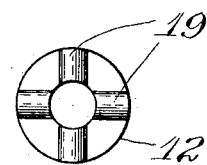

Fig. 1 is a side elevational, central sectional view of a teat cup liner constructed in accordance with the invention and showing it carried by a teat cup, only a portion of the cup, however, being shown; and Fig. 2 is a plan view of the bottom end of the improved liner.

The improved liner is shown in association with a metallic, tubular teat cup 10 having at its upper end a thickened outwardly turned flange 11 integral therewith. Only the upper portion of the cup has been shown as it is sufficient for the purposes of this disclosure. The teat engaging liner is molded and formed of rubber into a single, integral, unitary member, and comprises a soft, relatively thin, teat engaging body portion 12 of tubular construction, centrally suspended within the cup 10 by means of a relatively thicker head portion 13, also tubular, and having an internal annular groove 14 detachably engaging over the thickened flange 11 of the cup. The groove 14 is just below the point where the portion 12 merges into the head 13. Immediately above this point of mergence and upwardly spaced therefrom the head 13 has integrally formed therewith a locking or annular flange member 15 centrally apertured, as shown, the aperture being substantially coaxial with the bore of the body portion 12. Extending upwardly above this flange 15 the head has formed thereon an udder engaging shoulder 16, which functions to prevent the teat cup from running up on the udder, or, conversely, drawing the udder into the cup, to prevent injury to the cow. The point of mergence of the body 12 with the head 13, generally indicated at 17, in effect forms a flange similar to the flange 15, and the two cooperate to crimp the cow's teat between them, and in this manner retain the cup on the teat and prevent accidental disengagement of the cup from the teat.

The lower end of the liner body is thickened as at 18 and apertured to provide an outlet for the milk and is furthermore provided with radially extending ribs 19. During pulsations in the vacuum line, the liner will elongate and stretch lengthwise. If it stretches very considerably it will, of course, contact the valve in the teat cup, which controls the passage of milk to the milk can, and in this manner interfere with the vacuum and prevent the vacuum from entering the teat cup at times. These ribs insure that the vacuum can at all times pass freely into the upper part of the teat cup even when the liner contacts the valve mentioned, because they serve as spacers.

The construction is simple and inexpensive and, as its structure and functions have been thoroughly described, it is deemed unnecessary to sum up on its use and operation, as these will be apparent.

While only the preferred embodiment of the invention has been described and illustrated, it is, of course, capable of modification, and it should be herein understood that it is the intention to claim as part of this invention all such changes which come within the spirit and scope thereof, as indicated in the subjoined claims.

What we claim as new is:

1. A teat cup liner comprising a tubular body, an enlarged tubular head connected thereto, and a flat radially inwardly projecting flange integrally formed in the head and substantially spaced endwise from the body, there being an opening in the flange substantially in coaxial alinement with the tubular body.

2. A teat cup liner having a body and a head, there being a groove in the head for locking over the flange of a teat cup, an annular flange spaced endwise from said groove to form a second groove for locking on a teat, and a shoulder extending a substantial distance endwise of the flange.

In testimony whereof we affix our signatures.

WILLIAM ARNOLD HORTHY.
FLOYD G. HODSDON.